US007648353B2

(12) United States Patent
Meier et al.

(10) Patent No.: US 7,648,353 B2
(45) Date of Patent: Jan. 19, 2010

(54) VISUAL MONITORING DEVICE FOR ROTARY PRESS

(75) Inventors: Matthias Meier, Schwarzenbek (DE); Ingo Schmidt, Berkenthin (DE); Peter Lueneburg, Berkenthin (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/207,642

(22) Filed: Sep. 10, 2008

(65) Prior Publication Data

US 2009/0074900 A1 Mar. 19, 2009

(30) Foreign Application Priority Data

Sep. 13, 2007 (DE) ...................... 10 2007 043 581

(51) Int. Cl.
*B29C 43/08* (2006.01)

(52) U.S. Cl. ....................................... 425/173; 425/345

(58) Field of Classification Search ................. 425/135, 425/136, 138, 150, 169, 173, 344–345, 348 R
See application file for complete search history.

(56) References Cited

U.S. PATENT DOCUMENTS

| | | | | |
|---|---|---|---|---|
| 5,894,005 | A * | 4/1999 | Steel et al. | 425/135 |
| 6,079,968 | A * | 6/2000 | Schmitz et al. | 425/345 |
| 6,979,187 | B2 * | 12/2005 | Hinzpeter et al. | 425/135 |
| 7,125,234 | B2 * | 10/2006 | Scholz et al. | 425/167 |

* cited by examiner

*Primary Examiner*—Yogendra Gupta
*Assistant Examiner*—Thu Khanh T Nguyen
(74) *Attorney, Agent, or Firm*—Vidas, Arrett & Steinkraus, P.A.

(57) ABSTRACT

A visual monitoring device for rotary presses, in which a rotor, with upper and lower punches and a die plate, at least one compression station, at least one filling station, and at least one ejector station are arranged in a housing, at which individual process steps occur, characterized in that arranged in the housing is at least one high speed camera, whose lens is directed onto a location in the housing, and to which an image analysis device is connected.

6 Claims, 1 Drawing Sheet

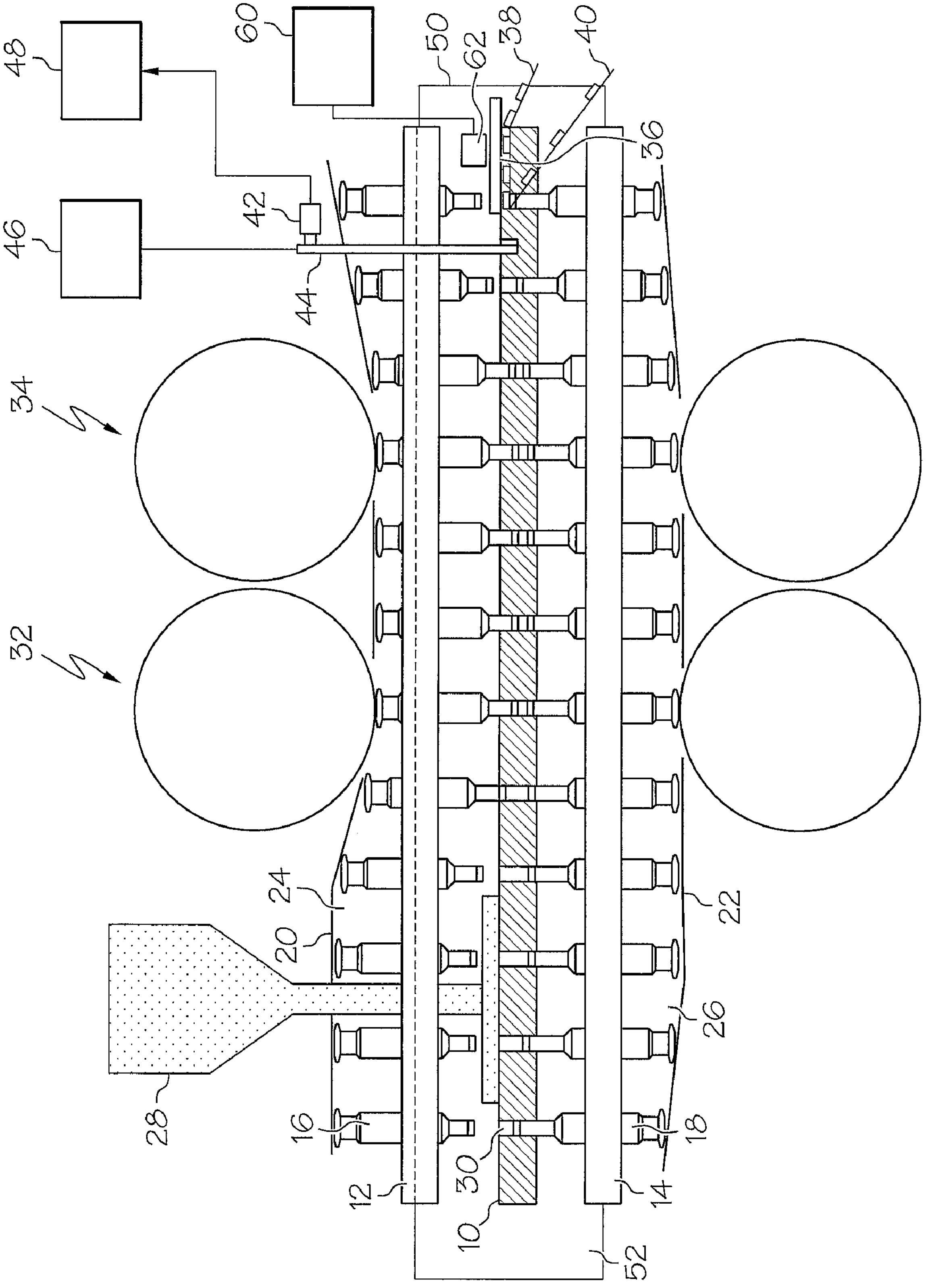
10
12
14
16
18
20
22
24
26
28
30
32
34
36
38
40
42
44
46
48
50
52
60
62

VISUAL MONITORING DEVICE FOR ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Rotary presses, as they as are used, for example, for the production of tablets, have a rotor, which guides the upper and lower punches and contains a die plate whose holes work together with the press punches. The rotor is driven about a vertical axis by a suitable drive. At least one filling apparatus, which fills the powder to be compressed into the die holes, is assigned to the rotor. Further, at least one compression station is provided with an upper and a lower compression roller, which push the assigned press punches into the die holes. Additionally, an ejector station, in which the ejected pellets are removed from the rotor, is assigned to the rotor. The ejector station can also contain a switch in order to separate good pellets from faulty pellets, or also to remove a number of test pellets. Such a rotary press is usually placed in a housing so that process dust does not escape, and on the other hand, a contamination of press parts by contaminated atmosphere of the environment is prevented.

It is known to assign different sensors with such a rotary press. For example, the compression force, which the compression rollers exert on the press punches is measured in order to set it to a desired value. The compression rollers can be adjusted by a suitable adjustment device. Furthermore, a temperature sensor can be located in the housing, or also a sensor with which the consistency of the material to be compressed, or the concentration of individual active agents can be determined. Further, sensors can be provided that monitor the correct assembly of the individual parts of the rotary press. The sensors are usually connected to a workstation computer for the rotary press. The workstation computer is connected to the rotary press via a cable. However, instead of a cable, a wireless transmission of sensor signals to and from the workstation computer can take place.

It is further known to make at least part of the rotary press housing transparent. Nonetheless, the view from the outside onto procedures that are relevant to the process is frequently hindered or impossible due to casing panels, e.g. due to a dust extraction system or other machine components. The rotary presses are driven, to some extent, at high speed. Rapid process sequences can hardly be tracked through observation with the human eye, e.g. the discharge of the tablets, the sorting and removal of the tablets, the plunging of the press punch into the bores of the punch receiver, etc.

The invention is based on the objective to create a visual monitoring device for rotary presses with which even rapidly proceeding productions can be recorded at any location of the rotary press.

BRIEF SUMMARY OF THE INVENTION

With the monitoring device according to the invention, at least one high speed camera, whose lens is directed onto a location in the housing, and that is connected to an image analysis device, is located in the housing of the rotary press.

With the invention, the high speed camera can be arranged at procedurally relevant positions within the rotary press, e.g. at the tablet outlet, the tablet deflector, in the position for sorting out faulty tablets, in the filling area for the dies, in the area of the heads of the press punches in the upper and lower space for control curves for the press punches, etc. An effective monitoring can be obtained through analysis of the signals of the high speed camera at relevant locations. The signals of the high speed camera, which preferably operates digitally, can be fed to the rotary press workstation computer and/or control computer, which are already supplied with a rotary press. Depending on the image analysis, not only monitoring of the individual functions can occur, but also, depending on the requirements, a control or regulation of the functions. Overall, the production process can be visually monitored. A visual monitoring can, for example, take place with regard to the punch heads, which are exposed to high forces in the compression stations.

According to an embodiment of the invention, an endoscope is arranged in front of the high speed camera, where the endoscope is directed with its lens onto the location to be monitored. In this way, it is possible to install the high speed camera at a location that is less encumbered by the operation of the rotary press, than is the case directly in the area to be monitored.

According to another embodiment of the invention, the process space of the rotary press is enclosed by an inner housing that is essentially in sealing contact only with the sections of the rotor on the upper and lower sides of the die plate. The high speed camera is located outside of the processing space and the endoscope is led into the process space in a sealed way. With this system, the press punches and die plate remain in the rotary press during cleaning. Thereby the end of the endoscope facing the location to be monitored also remains within the process space and is subjected to the cleaning process. The camera itself is separated from the contaminated atmosphere in the process space, and therefore, can function without disturbance.

Because dust development in the process space can coat the lens of the endoscope, and can thereby impair the view, a blower device can direct air against the lens and keep it free from dust.

BRIEF DESCRIPTION OF THE VIEW OF THE DRAWING

FIG. 1. shows a schematic unrolled representation of a rotary press with a visual monitoring device according to the invention.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated A rotor for a rotary press is represented in the figure by a die plate 10, an upper punch receiver 12, and a lower punch receiver 14, which are usually connected together in a unit. The rotor formed in this way is driven about a vertical axis by a suitable drive motor (not represented here).

The punch guides 12, 14 guide the upper punches 16 and the lower punches 18, and their heads interact with the upper curve elements 20 and the lower curve elements 22. The area between the punch receivers 12 and 14 and the curve elements 20, 22 is designated as the upper curve space 24 and lower curve space 26, respectively.

A filling apparatus 28 is assigned to the rotor, to fill the die holes 30 with the powder to be compressed, as shown. Two compression stations 32 and 34, located in series, each contain an upper and a lower compression roller, which interact with the heads of the press punches 16, 18 in order to compress the powder located in the die holes 30. As can be recognized on the right of the figure, the darkly represented pellets are discharged using the lower punches 18, and directed by means of a deflector 36 to a goods outlet 38. The deflector 36 is also has the ability to sort out faulty tablets, which are led out via a fault outlet 40.

The parts and functions of a rotary press described so far are known.

Further represented in the Figure is a high speed camera 42, which observes the process space via an endoscope 44. The camera is suitable to create images with high resolution in dark or faint surroundings, and at high processing speeds. The lens at the lower end of the endoscope 44 is directed onto the deflector device. The endoscope is provided with light from a light source 46, and the high speed camera 42 is connected to a workstation computer 48 for the rotary press shown. The workstation 48 computer is arranged at the machine, or at a location remote from the rotary press. The connection exists either via a cable or also via a wireless communication path.

As can be further recognized in the Figure, a housing 50 is provided that encloses a process space 52. The housing 50 is in a sealing contact with the upper and lower punch receivers 12, 14. Thus, as can be seen, the endoscope is led into the process space 52 in a sealed way. Here, the high speed camera 42 is located outside of the process space 52.

With the signals of the high speed camera 42 going to the workstation computer 48, the area of the deflector device 36 can be monitored. Further, an adjustment of the deflector can be made, in case this turns out to be necessary, e.g. from outside of the encapsulated process space.

It is understood that a visual monitoring, such as is shown in connection with the deflector device 36, can also be utilized at any other location inside and outside of the process space 52 of the rotary press shown, e.g., also to control or to regulate functions of the rotary press. Further, a visual monitoring of the tablets, e.g., for break-offs or impurities, or for stampings can occur. Finally, the punches can be monitored, e.g., for break-offs or incursions.

Furthermore, a blower device 60 is provided that directs air via a jet nozzle 62 against the lens of the endoscope in order to keep the lens dust-free.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A visual monitoring device for rotary presses, in which a rotor, with upper and lower punches and a die plate, at least one compression station, at least one filling station, and at least one ejector station are arranged in a housing, at which individual process steps occur, characterized in that arranged in the housing is at least one high speed camera (42), whose lens is directed onto a location in the housing, and to which an image analysis device is connected.

2. The monitoring device according to claim 1, characterized in that the camera is directed onto at least one of the processing stations.

3. The monitoring device according to claim 1, characterized in that the rotary press has a workstation computer (48), and that the output signal of the high speed camera is transmitted to the workstation computer (48).

4. The monitoring device according to claim 1, characterized in that an endoscope (44) is arranged in front of the camera (42), and that the lens of the endoscope (44) is directed onto the location to be monitored.

5. The monitoring device according to claim 4, characterized in that a process space (52) of the rotary press is enclosed by an inner housing (50), that is essentially in sealing contact only with the sections (12, 14) of the rotor on the upper and lower sides of the die plate (10), and that the high speed camera (42) is arranged outside of the process space (52), and the endoscope (44) is led into the process space (52) in a sealed way.

6. The monitoring device according to claim 1, characterized in that a blower device is provided that blows air against the lens of the camera or of the endoscope for the purpose of dust removal.

* * * * *

US007648353C1

(12) EX PARTE REEXAMINATION CERTIFICATE (9948th)

United States Patent

Meier et al.

(10) Number: US 7,648,353 C1

(45) Certificate Issued: Nov. 18, 2013

(54) VISUAL MONITORING DEVICE FOR ROTARY PRESS

(75) Inventors: Matthias Meier, Schwarzenbek (DE); Ingo Schmidt, Berkenthin (DE); Peter Lueneburg, Berkenthin (DE)

(73) Assignee: Fette GmbH, Schwarzenbek (DE)

Reexamination Request:
No. 90/011,197, Oct. 4, 2010

Reexamination Certificate for:
Patent No.: 7,648,353
Issued: Jan. 19, 2010
Appl. No.: 12/207,642
Filed: Sep. 10, 2008

(30) Foreign Application Priority Data

Sep. 13, 2007 (DE) ......................... 10 2007 043 581

(51) Int. Cl.
*B29C 43/08* (2006.01)
*B30B 11/00* (2006.01)
*B30B 11/08* (2006.01)
*B30B 15/32* (2006.01)

(52) U.S. Cl.
CPC ............... *B30B 11/005* (2013.01); *B30B 11/08* (2013.01); *B30B 15/32* (2013.01)
USPC .......................................... 425/173; 425/345

(58) Field of Classification Search
None
See application file for complete search history.

(56) References Cited

To view the complete listing of prior art documents cited during the proceeding for Reexamination Control Number 90/011,197, please refer to the USPTO's public Patent Application Information Retrieval (PAIR) system under the Display References tab.

*Primary Examiner* — Terrence Till

(57) ABSTRACT

A visual monitoring device for rotary presses, in which a rotor, with upper and lower punches and a die plate, at least one compression station, at least one filling station, and at least one ejector station are arranged in a housing, at which individual process steps occur, characterized in that arranged in the housing is at least one high speed camera, whose lens is directed onto a location in the housing, and to which an image analysis device is connected.

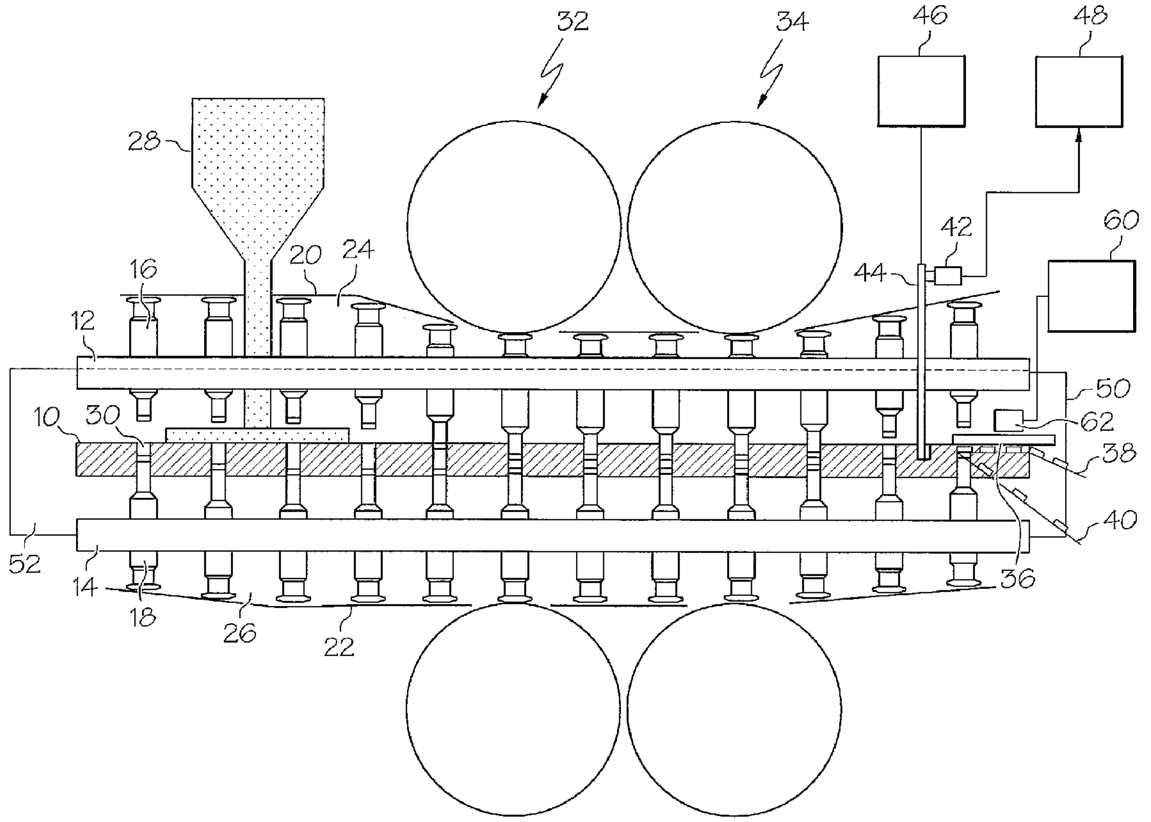

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

* * * * *